United States Patent [19]

Edmondson

[11] 4,007,145
[45] Feb. 8, 1977

[54] METHOD OF POLYMERIZING CHLOROPRENE USING CONJUGATED LONG-CHAIN FATTY ACIDS AS EMULSIFIERS
[75] Inventor: Morris S. Edmondson, Alvin, Tex.
[73] Assignee: Petro-Tex Chemical Corporation, Houston, Tex.
[22] Filed: Jan. 10, 1975
[21] Appl. No.: 540,279
[52] U.S. Cl. .................. 260/23.7 H; 260/29.7 H; 260/42.33; 260/890; 526/216; 526/220; 526/222; 526/223; 526/295
[51] Int. Cl.² ........................................ C08L 91/00
[58] Field of Search ..... 260/23.7 H, 42.3, 29.7 SQ, 260/83.5, 890, 29.7 H; 526/216, 220, 222, 223, 295

[56] References Cited
UNITED STATES PATENTS

| | | | |
|---|---|---|---|
| 1,950,436 | 3/1934 | Williams | 260/92.3 |
| 2,227,517 | 1/1941 | Starkweather | 260/92.3 |
| 2,321,693 | 6/1943 | Meisenburg et al. | 260/92.3 |
| 2,371,719 | 3/1945 | Starkweather | 260/29.7 SQ |
| 2,831,842 | 4/1958 | Aho | 260/92.3 |
| 2,914,497 | 11/1959 | Keller | 260/92.3 |
| 3,147,317 | 9/1964 | Jungk | 260/890 |
| 3,392,134 | 7/1968 | Apotheker | 260/92.3 |

Primary Examiner—Donald E. Czaja
Assistant Examiner—W. E. Parker
Attorney, Agent, or Firm—N. Elton Dry; Kenneth H. Johnson

[57] ABSTRACT

Long-chain fatty acids having conjugated unsaturation, such as tung acid, when used as emulsifiers in the polymerization of chloroprene, produce polymers having higher tensile strength than produced by similar unconjugated fatty acid emulsifiers.

17 Claims, No Drawings

METHOD OF POLYMERIZING CHLOROPRENE USING CONJUGATED LONG-CHAIN FATTY ACIDS AS EMULSIFIERS

BACKGROUND OF THE INVENTION

The present invention relates to an improved method for the polymerization of chloroprene to produce polychloroprene having improved tensile strength. More particularly, the present invention relates to the discovery of new emulsifiers which produce unexpected improvements in tensile strength.

Any study of the prior art of polychloroprene, neoprene, will reveal an almost total disregard for the effect of the emulsification system on the resulting polymer. In general, most of the prior art has regarded the emulsifiers as roughly equivalent, in effect, with the primary consideration being directed to the satisfactory performance of the emulsificaton, e.g., the colloidal stability of emulsion.

It is taught in U.S. Pat. No. 3,392,134 to Apotheker, that the fatty acids such as straight-chain saturated or unsaturated carboxylic acids containing 12 to 30 carbon atoms or the dimers and trimers of unsaturated fatty acids are critical if the latex resulting during chloroprene polymerization is to be colloidally stable during post treatment.

It has now been found that the selection of a particular class of soluble salts of fatty acids as emulsifiers for the emulsion polymerization of chloroprene produces polymers having higher tensile strengths than the usual emulsifiers. Thus, it is a feature of the present invention that the same degree of emulsification efficiency may be obtained with higher tensile strength than achieved by the prior art.

SUMMARY OF THE INVENTION

Briefly stated, the present invention is an improvement in the process of emulsion polymerization of chloroprene, wherein the emulsifier comprises a soluble salt of a long-chain fatty acid having 10 to 30 carbon atoms and conjugated ethylenic unsaturation, preferably two to three conjugated ethylenic unsaturations. Fatty acid conjugated trienes have been found to be preferable. The dienes and trienes may be used in admixture with each other or in admixture with other emulsifying agents. When employed with other emulsifying agents, the diene and triene fatty acid salts preferably comprise at least 10 weight percent of the total emulsifying agents in the polymerization system, and preferably at least about 25 weight percent.

DETAILED DESCRIPTION OF THE PREFERRED EMBODIMENTS

Polychloroprene may be prepared by techniques such as disclosed in U.S. Pat. Nos. 1,950,436; 2,227,517; 2,321,693; 2,371,719; 2,463,009; 2,831,842; 2,914,497; 3,042,652; 3,147,318; 3,147,317; 3,655,827; British Patents 1,237,750 and 1,158,970. Process and methods for the polymerization of chloroprene are disclosed, for example, in *Encyclopedia of Polymer Science and Technology*, Vol. 3, p. 705–730 Interscience, 1965.

Comonomers may be employed with the selection and quantities of comonomer being chosen to produce a polymer. In this application, the term "polymers of chloroprene" encompasses polymers in which chloroprene is the major monomer. Examples of comonomers are 2, 3-dichloro-1, 3-butadiene; acrylonitrile; methyl methacrylate, and other esters, amides, nitriles, vinyl aromatic compounds such as styrene, aliphatic conjugated diolefins such as isoprene and vinyl ethers such as methyl vinyl ether. Usually the total amount of comonomers will represent no greater than 25 mol percent of the total monomers and preferably will constitute less than 15 mol percent of the total monomers including chloroprene.

The polymerization is carried out in an aqueous systems and may be batch or continuous processes. The conjugated fatty acids may be employed as the water soluble salts, e.g., sodium, potassium, amine and the like. Suitable conjugated fatty acids include, for example, 9, 11, 13-octadecatrienoic acid, 9, 11-octadecadienoic acid and 9, 11, 13, 15-octadecatetraenoic acid. The usual emulsifiers which may be employed in conjunction with the present fatty acids are the salts of rosins and rosin derivatives such as wood rosin, or tall oil rosin and resins, disproportionated rosin or hydrogenated rosin; ammonium, sodium or potassium salts of longchain fatty acids; alkali and alkaline earth salts of the condensate of formaldehyde and naphthalene sulfonic acid; octyl sulfate salts; nonionic surface active agents such as the ethylene oxide or propylene oxide condensation products. Additional emulsifying agents are disclosed in U.S. Pat. No. 2,264,173.

The total amount of the emulsifying composition should range from about 2 to 5 parts per 100 parts of monomer used in the polymerization. Although the conjugated fatty acid salts according the present invention may comprise the entire emulsifier system it is preferred that one of the other types, preferably a resin be employed in conjunction therewith in amounts up to 90 weight % of the total emulsifier, or more preferably 70%, i.e., the conjugated fatty acid will comprise 30 to 100% of the emulsifier. The fatty acid type emulsifiers when used exclusively, tend to impart an oily texture to the polymer product, which is moderated by resin type emulsifier which serve a tackifying function.

The pH of the aqueous emulsion for polymerization may be varied and can be acidic, neutral or alkaline; however, it is peferred to have a pH in the alkaline range of about 7 to 13.5.

Conventional catalysts for chloroprene polymerization may be employed and preferred catalysts are peroxide catalysts of the organic or inorganic type. Examples of organic peroxides are benzoyl peroxide, cumene hydroperoxide, tertiary-butyl isopropylbenzene hydroperoxide, azo catalysts such as alpha-alpha-azo-bis-isobutyronitrile and the like. Suitable inorganic peroxides are salts of inorganic per acids including persulfates, perborates or percarbonates, e.g., ammonium or potassium persulfate and hydrogen peroxide. The catalyst may be used in amounts required to bring about polymerization at any desired rate with suitable ranges being from 0.001 to 0.5 parts by weight per 100 parts of polymerizable monomer.

The usual modifiers or other agents may be present in the emulsion. For instance, the polymerization may be carried out in the presence of sulfur to produce a sulfur modified polychloroprene. Also, chain-transfer agents may be employed such as the alkyl mercaptans, e.g. dodecyl mercaptan, iodoform, benzyl iodide and dialkyl xanthogen disulfides, e.g., diisopropyl xanthogen disulfide and polysulfide compounds, e.g., i-propyl (O-ethyl dithiocarbonoxy) sulfide. Preferred modifiers are mercaptans and dialkyl xanthogen disulfides with from 0.10 to 3 parts by weight per 100 parts of total monomer with the range of about 0.25 to 0.6 being especially preferred.

A particularly valuable group of chain-transfer agents are the polysulfide compounds noted above. The polysulfides have the formula

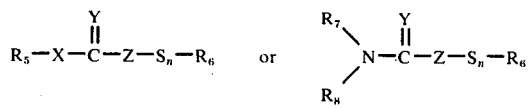

wherein X, Y and Z are selected from the group consisting of oxygen and sulfur, $R_5$ is a hydrocarbon radical having from 1 to 8 carbon atoms, $R_6$ is a hydrocarbon radical having from 1 to 8 carbon atoms or is a radical the same as

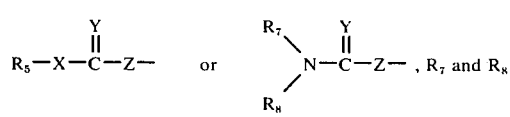, $R_7$ and $R_8$ are selected from the group consisting of hydrocarbon radicals having from 1 to 8 carbon atoms or hydrogen with at least one of $R_7$ and $R_8$ not being hydrogen and n is 1 to 4. Compounds of this type may be formed, e.g., as disclosed in Twiss, D., *JACS* 49, February 1927, p. 491-494. The hydrocarbon radicals can be acyclic, cycloaliphatic, aromatic or combinations thereof. For example, the radicals can be methyl, ethyl, n-propyl, isopropyl, n-butyl, isobutyl, n-pentyl, 2-ethyl hexyl, cycloaliphatic radicals having 5 or 6 carbons, aryl radicals such as phenyl, alkaryl radicals such as methylphenyl, combinations thereof and so forth. Examples of suitable polysulfide compounds are di(O-ethyl dithiocarbonoxy) sulfide, di(O-ethyl dithiocarbonoxy) disulfide, isopropyl (O-ethyl dithiocarbonoxy) disulfide and so forth. Particularly useful polysulfides are those having the general structure

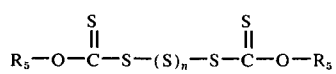

wherein $R_5$ and n have the significance noted above. Particularly preferred are polysulfides of the structure

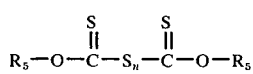

wherein n is 3 to 4, such as di(O-isopropyl dithiocarbonoxy) sulfide.

The usual methods may be employed to prepare an aqueous emulsion of the monomeric material and emulsifying agent and water. The proportions are not critical, but generally, the monomer will be present in an amount such as from 30 to 60 percent by weight based on the total weight of the polymerization system. The temperature of polymerization may be varied with suitable ranges being from 0° to 90° C with the preferred range being between 15° C and 55° C. The polymerizations may be short stopped by the addition of agents such as paratertiary-butyl catechol and thiodiphenylamine. The present invention is particularly useful for the preparation of the so-called "high solids" latex. The polymers prepared according to this invention are also useful for the preparation of sol-gel blends, such as described in U.S. Pat. Nos. 3,042,652; 3,147,317; and 3,147,318. Thus, the present conversion of monomer is usually from about 60 to 90 or 100%, i.e., at least 60%.

EXAMPLES 1-7

In these examples, conventional emulsifiers are compared to a conjugated triene. The polymerizations were carried out under a nitrogen blanket at 45° C. These conversions were carried to 100%.

| LATEX RECIPE | |
|---|---|
| POLYMERIZATION CHARGE | Parts by Weight |
| Monomer Solution | |
| Chloroprene | 100.000 |
| $CHI_3$(Iodoform) | 0.100 |
| Sulfur | 0.010 |
| Emulsifier- | 3.000 |
| BHT | 0.100 |
| Water Solution | |
| Water (total) | 94.500 |
| Sodium Hydroxide (100%) | ~1.250*** |
| Lomar-PW** | 0.300 |
| PUMPED CATALYST | |
| Water | 95.400 ⎫ |
| Potassium Persulfate | 4.500 ⎬ * |
| Silver Salt | 0.115 ⎭ |
| CONDITIONS | |
| Polymerization Temperature ° C | 45 (113° F) |
| Polymerization Time, Hrs. | 8 (approx.) |
| Conversion, % | 100 |
| Solids, % | 49 - 51 |

*These numbers are intended to represent a % mix and are not related to amount to be used. The catalyst will be used as required to maintain the polymerization. When the sp. gr. change becomes very slight, i.e., a change of 0.002 per hour, the catalyst pump may be shut off and the latex allowed to "cook" until the 100% conversion level is attained.
**Sodium salt of condensate of formaldehyde and naphthalenesulfonic acid.
***Total amount of caustic used was that necessary to neutralize fatty acids and provide a caustic reserve of 0.8 parts.

Several latexes were prepared and tested as to both cured and uncured tensile strength.

Dipped films are prepared in the following manner. The latex is compounded in the following recipe:

| Components | Parts by Weight |
|---|---|
| Polymer (dry basis) | 100 |
| Plasticizer (anionic, sulfated fatty acid ester) | 2 |
| Water | 19 |
| Sodium Salt of Condensate of Formaldehyde and Naphthalene-sulfonic acid | .2 |
| Zinc Oxide | 5.0 |
| Fatty Alcohol Ethoxylate-emulsifier (10% aqueous solution) | 1.25 |
| Tetraethyl Thiuram Disulfide | 1.0 |
| Ammonium Caseinate (15% aqueous solution) | 1.25 |
| Clay | 10.0 |
| Sodium Dibutyl Dithiocarbamate (45% aqueous solution) | 2.22 |
| Antioxidant[2,2'-methylene-bis-(4-methyl-6-t-butyl phenol)] | 5.0 |

The components, with the exception of the polymer, were milled in a ball mill and added to a latex of the polymer with stirring. A form, generally a glass plate, is immersed in a coagulant solution consisting of 70 parts of absolute ethanol and calcium nitrate tetrahydrate. The form is withdrawn from the coagulant solution and immersed in the compounded latex for 2 minutes. The form coated with the latex is removed from the latex and reimmersed in the coagulant solution for 2 seconds. Immerse the forms in cold water for 10 seconds to remove surface coagulant. The coagulated film is stripped from the form and leached at 40° C for 2 hours in demineralized water. The leached film is dried for 4 hours at 45° C (tested at this point for no-cure properties). The dried samples are cured for 30 minutes at 140° C and tested for cured properties. Test results for uncured and cured samples are set out below in Table I.

-continued

HIGH SOLIDS LATEX RECIPE

| Polymerization Charge | Parts by Wt. |
|---|---|
| Emulsifier | 1.14 |

[1]Disproportionated wood resin obtained from Hercules, Inc. with specifications of minimum of 60° for specific rotation, acid number of 137 to 145, minimum of 48% dehydroabietic acid, maximum of 1.9 ultra violet absorptivity at 245 millimicrons. The 731-SA is soda ash treated 731-S disproportionated wood resin. About 1.8 parts is equivalent to 1.76 parts of free acid resin.
[2]The material used is "Daxad 11 KLS" supplied by W. R. Grace and Co. It is the potassium salt of the condensate of formaldehyde and alkylnaphthalenesulfonic acid; it is stable in the presence of mild acids and alkalies; it has practically no tendency to foam and it has a pH (1% sol. at 72° F.) of 7 to 8.5.

TABLE I

| Example | Emulsifier | "No-cure" Modulus 300% | "No-cure" Modulus 600% | Tensile Strength, psi | % Elongation | 30' - Cure at 140° C Modulus 300% | 30' - Cure at 140° C Modulus 600% | Tensile Strength, psi | % Elongation |
|---|---|---|---|---|---|---|---|---|---|
| 1 | Oleic Acid-3 parts | 145 | 390 | 1065 | 1050 | 195 | 825 | 2230 | 750 |
| 2 | Linoleic Acid-3 parts | 120 | 380 | 860 | 1000 | 195 | 870 | 2230 | 750 |
| 3 | Oleic Acid-2 parts | 150 | 410 | 1750 | 1100 | 170 | 600 | 2530 | 880 |
| | (1) Tung Acid-1 part | | | | | | | | |
| 4 | (1) Tung Acid-3 parts | 190 | 450 | 2160 | 1100 | 190 | 910 | 3300 | 800 |
| 5 | Oleic Acid-2 parts | 120 | 390 | 790 | 900 | 180 | 850 | 2200 | 800 (3) |
| | (2) Empol 1022–1 part | | | | | | | | |
| 6 | Linoleic Acid-3 parts (Wochem No. 430 ~32%9, 11-isomer) | 185 | 375 | 1460 | 1150 | 235 | 645 | 2335 | 850 |
| 7 | Oleic Acid-2.67 parts Sorbic Acid-0.33 parts | 135 | 350 | 980 | 1075 | 210 | 675 | 2275 | 775 (4) |

*All acids were converted to the sodium salts under the conditions of reaction.
(1) Chinawood acid, Acid No. 195–202 saponification No. 198–204, Iodine No. (WIJS) 160 min., Titre of fatty acids ° C 38–44, typical analysis, 4% palmitic acid, 1% stearic acid, 8% oleic acid, 8% linolenic acid, 5% linoleic acid, 73% elaeostearic acid (9, 11, 13-octadecatrienoic acid) - Woburn Chemical Corporation.
(2) Essentially a $C_{36}$ dibasic acid resulting from the polymerization of linoleic acid. The dimer content is about 75%, the trimer content is about 22% and the monomer content is about 3%.
(3) Coagulum formed during polymerization.
(4) ~1% coagulum formed during polymerization.

EXAMPLES 8 – 12

In these examples tung acid was employed in a one-shot high solids latex recipe.

HIGH SOLIDS LATEX RECIPE

| Polymerization Charge | Parts by Wt. |
|---|---|
| Chloroprene | 100.00 |
| Resin 731-SA[1] | 1.84 |
| Dodecyl Mercaptan | 0.13 |
| Water | 60 |
| Potassium Hydroxide (100%) | 1.13 |
| Potassium Phosphate (100%) | 0.5 |
| Daxad 11 KLS[2] (100%) | 3.00 |

These examples are all run in a 5 liter glass reactor equipped with a paddle agitator and are run under a nitrogen atmosphere at 45° C. In all of these examples no catalyst is charged to the reactor initially, but a mixture of 0.25% potassium persulfate, 0.05% silver salt (sodium-2-anthraquinone sulphonate) and 99.7% water is fed until the total monomer has reached 80% conversion at which time the pumped catalyst mixture is 4.5% potassium persulfate, 0.1% silver salt, 95.4% water. Polymerization is controlled to achieve about 95% conversion at 6 hours with the final percent conversion being about 99.5% after about an additional 4 hours. In the case of the surfactants or additives, the parts are based on the surfactants as received from the manufacturer.

The latexes were tested in both the cured and uncured form for tensile strength improvement. The cured samples were prepared as described in the prior examples. The results of testing are set out below in Table II.

TABLE II

| | Emulsifier | | No-Cure | | | | | 30 Min. Cure at 140° C | | | |
|---|---|---|---|---|---|---|---|---|---|---|---|
| | | | Final | Final | Modulus | | Tensile | | Modulus | | Tensile |
| Example | Type | Amount PPH | % Solids | Viscosity (CPS) | 300% | 600% | Strength (psi) | % Elongation | 300% | 600% | Strength (psi) | % Elongation |
| 8 | Empol 1056 A[1] | 1.14 | 59.55 | 45 | 155 | 370 | 1900 | 1350 | 305 | 890 | 3290 | 900 |
| 9 | Tung Acid | 1.14 | 59.63 | 40 | 160 | 460 | 2120 | 1200 | 220 | 765 | 3480 | 850 |
| 10[2] | Tung Acid | 1.14 | 52.53 after stripping | 15 | 180 | 430 | 2390 | 1300 | 280 | 890 | 3680 | 950 |
| 11[3] | Empol 1056A | 0.5 | 60.26 | 65 | 270 | 420 | 2350 | 1325 | 295 | 500 | 3450 | 975 |
| | Tung Acid | 0.6 | | | | | | | | | | |
| 12[4] | Tung Acid | 1.14 | 57.80 | — | 375 | 550 | 2480 | 1225 | 355 | 925 | 3520 | 925 |

[1] Emery Industries, Inc.; polybasic acid analysis, monobasic acid ~1%, dibasic acid~59%, tribasic acid 0. polybasic acid ~40%, estimated carboxyl functionality 2.65–2.75, acid value 188–192.
[2] Sample was short-stopped at 90% conversion and stripped.
[3] 0.75 parts $K_3PO_4$ containing 20% $H_2O$ of hydration used in recipe.
[4] Used di(O-isopropyl dithiocarbonoxy) sulfide in place of dodecyl mercaptan.

The invention claimed is:

1. In the process of aqueous emulsion polymerization of polymerizable monomer comprising chloroprene and up to 25 weight percent of polymerizable comonomer in the presence of catalyst, modifiers and emulsifiers at a temperature of 0°–90° C wherein the improvement comprises said emulsifier 10 to 100 weight % of a conjugated fatty acid having 10 to 30 carbon atoms and selected from 9, 11-octadecadienoic acid, 9, 11, 13-octadecatrienoic acid or 9, 11, 13, 15-octadecatetraenoic acid.

2. The process according to claim 1 wherein said conjugated fatty acid is 9, 11-octadecadienoic acid or 9, 11, 13-octadecatrienoic acid.

3. The process according to claim 1 wherein from 2 to 5 parts by weight of emulsifying composition per hundred based on total polymerizable monomer are present.

4. The process according to claim 1 wherein said emulsifier contains a salt of wood rosin, tall oil rosin, disproportionated rosin or hydrogenated rosin.

5. The process of polymerizing monomers comprising a major amount of chloroprene and up to about 25 mol percent of a polymerizable comonomer comprising admixing about 30 to 60 weight % of said monomers based on the weight of the polymerization system with water in the presence of an emulsifier comprising a soluble salt of a long-chain fatty acid having 10 to 30 carbon atoms, having conjugated ethylenic unsaturation, and selected from 9, 11-octadecadienoic acid, 9, 11, 13-octadecatrienoic acid or 9, 11, 13, 15-octadecatetraenoic acid, and polymerizing said monomers at temperatures in the range of 0° to 90° C.

6. The process according to claim 5 wherein from 0.10 to 3 parts by weight per hundred based on total polymerizable monomer of modifier are present.

7. The process according to claim 6 wherein said modifier is sulfur, alkyl mercaptan, iodoform, benyl iodide, dialkyl xanthogen disulfide or organic polysulfides.

8. The process according to claim 6 wherein said modifier comprises alkyl mercaptan.

9. The process according to claim 6 wherein said modifier comprises organic polysulfide.

10. A new composition of matter comprising chloroprene polymers formed by the process of
 1. polymerizing chloroprene at a temperature in the range of 0° to 90° C in aqueous emulsion in the presence of 2 to 5 parts by weight per 100 parts of polymerizable monomer of an emulsifier comprising at least 10 weight % of conjugated fatty acid having 10 to 30 carbon atoms and selected from 9, 11-octadecadienoic acid, 9, 11, 13-octadecatrienoic acid or 9, 11, 13, 15-octadecatetraenoic acid, and
 2. continuing said polymerization to obtain monomer conversion of at least 60%.

11. The process according to claim 1 wherein said fatty acid is 9, 11 - octadecadienoic acid.

12. The process according to claim 1 wherein said fatty acid is 9, 11, 13 -octadecatrienoic acid.

13. The process according to claim 1 wherein said fatty acid is 9, 11, 13, 15 -octadecatetraenoic acid.

14. The process according to claim 1 wherein said fatty acids are employed as water soluble salts thereof.

15. The composition of matter according to claim 10 wherein said fatty acid is 9, 11-octadecadienoic acid.

16. The composition of matter according to claim 10 wherein said fatty acid is 9, 11, 13-octadecatrienoic acid.

17. The composition of matter according to claim 10 wherein said fatty acid is 9, 11, 13, 15-octadecatetraenoic acid.

* * * * *

UNITED STATES PATENT OFFICE
CERTIFICATE OF CORRECTION

PATENT NO. : 4,007,145
DATED : February 8, 1977
INVENTOR(S) : Morris S. Edmondson It is certified that error appears in the above—identified patent and that said Letters Patent are hereby corrected as shown below:

Column 2, line 44 reads "peferred" but should read -- preferred --

Column 7, line 29 reads "emulsifier 10" but should read -- emulsifier comprising 10 --

Signed and Sealed this

Fifth Day of August 1980

[SEAL]

Attest:

SIDNEY A. DIAMOND

Attesting Officer       Commissioner of Patents and Trademarks